United States Patent
Digalakis et al.

(10) Patent No.: US 6,256,607 B1
(45) Date of Patent: Jul. 3, 2001

(54) METHOD AND APPARATUS FOR AUTOMATIC RECOGNITION USING FEATURES ENCODED WITH PRODUCT-SPACE VECTOR QUANTIZATION

(75) Inventors: Vassilios Digalakis, Hania (GR); Leonardo Neumeyer, Palo Alto, CA (US); Stavros Tsakalidis, Makrohori Verias (GR); Manolis Perakakis, Ierapetra (GR)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/149,844

(22) Filed: Sep. 8, 1998

(51) Int. Cl.$^7$ .............. G10L 15/02; G10L 15/06; G10L 15/14

(52) U.S. Cl. .............. 704/222; 704/229; 704/240; 704/243

(58) Field of Search .................. 704/201, 222, 704/229, 230, 240, 245, 254, 255, 243, 244

(56) References Cited

U.S. PATENT DOCUMENTS

| | | | | |
|---|---|---|---|---|
| 4,535,472 | * | 8/1985 | Tomcik | 704/229 |
| 5,535,305 | * | 7/1996 | Acero et al. | 704/256 |
| 5,664,053 | * | 9/1997 | Laflamme et al. | 704/219 |
| 5,745,873 | * | 4/1998 | Braida et al. | 704/222 |
| 5,774,839 | * | 6/1998 | Shlomot | 704/222 |
| 5,790,759 | * | 8/1998 | Chen | 704/230 |
| 5,819,224 | * | 10/1998 | Xydeas | 704/266 |
| 5,825,978 | * | 10/1998 | Digalakis et al. | 704/256 |
| 5,864,810 | * | 1/1999 | Digalakis et al. | 704/255 |
| 5,890,110 | * | 3/1999 | Gersho et al. | 704/222 |
| 5,903,866 | * | 5/1999 | Shoham | 704/265 |
| 5,913,188 | * | 6/1999 | Tzirkel-Hancock | 704/223 |
| 6,067,515 | * | 5/2000 | Cong et al. | 704/243 |

OTHER PUBLICATIONS

Tsakalidis et al., "Efficient Speech Recognition Using Sub-vector Quantization and Discrete–mixture HMMs," 1999 IEEE International Conference on Acoustics, Speech, and Signal Processing, Mar. 1999, vol. 2, pp. 569–572.*

Goddeau et al., "Deploying Speech Applications over the Web", Proceedings Eurospeech, pp. 685–688, Rhodes, Greece (Sep. 1997).

Julia et al., "http://www.speech.sri.com/demos/atis.html", Proceedings AAAI '97, Stanford, CA (Mar. 1997).

Hurley et al., "Telephone Data Collection Using The World Wide Web", Proceedings International Conference on Spoken Language Processing, pp. 1898–1901, Philadelphia, PA (Oct. 1996).

Bayer, "Embedding Speech In Web Interfaces", Proceedings International Conference on Spoken Language Processing, pp. 1684–1687, Philadelphia, PA (Oct. 1996).

(List continued on next page.)

*Primary Examiner*—William R. Korzuch
*Assistant Examiner*—Martin Lerner
(74) *Attorney, Agent, or Firm*—Townsend and Townsend and Crew LLP; Kenneth R. Allen

(57) ABSTRACT

An automatic recognition system and method divides observation vectors into subvectors and determines a quantization index for the subvectors. Subvector indices can then be transmitted or otherwise stored and used to perform recognition. In a further embodiment, recognition probabilities are determined for subvectors separately and these probabilities are combined to generate probabilities for the observed vectors. An automatic system for assigning bits to subvector indices can be used to improve recognition.

19 Claims, 4 Drawing Sheets

OTHER PUBLICATIONS

Sokolov, "Speaker Verification On the World Wide Web", Proceedings Eurospeech, pp. 847–850, Rhodes, Greece (Sep. 1997).

Hemphill et al., "Developing Web–Based Speech Applications", Proceedings Eurospeech, pp. 895–898, Rhodes, Greece (Sep. 1997).

Young, "A Review of Large–Vocabulary Continuous–Speech Recognition", *IEEE Signal Processing Magazine,* pp. 45–57 (Sep. 1996).

Davis et al., "Comparison of Parametric Representations for Monosyllabic Word Recognition in Continuously Spoken Sentences", *IEEE Trans. Acoustics Speech and Signal Processing,* vol. ASSP–28(4), pp. 357–366 (Aug. 1980).

Digalakis et al., "Genones: Optimizing the Degree of Mixture Tying in a Large Vocabulary Hidden Markov Model Based on Speech Recognizer", *IEEE Trans. Speech Audio Processing,* pp. 281–289 (Jul. 1996).

Makhoul et al., Vector Quantization in Speech Controlling, Proceedings of the IEEE, vol. 73, No. 11, pp. 1551–1588 (Nov. 1985).

Price, "Evaluation of Spoken Language Systems: the ATIS Domain", Proceedings of the Third DARPA Speech and Natural Language Workshop, Hidden Valley, PA (Jun. 1990) Morgan Kaufman.

* cited by examiner-

METHOD AND APPARATUS FOR AUTOMATIC RECOGNITION USING FEATURES ENCODED WITH PRODUCT-SPACE VECTOR QUANTIZATION

BACKGROUND OF THE INVENTION

The present invention is related to the field of efficient numerical encoding of physical data for use in an automatic recognition system. A particular application is the field of speech encoding for storage or transmission and for recognition. The invention addresses problems of efficient numerical encoding of physically derived data and efficient computation of likelihood scores during automatic recognition.

A high level of detailed technical and mathematical skill is common of practitioners in the art. This application presumes familiarity with known techniques of speech recognition and related techniques of numerically encoding physical data, including physical waveform data. This application briefly reviews some basic types of prior art encoding and recognition schemes in order to make the description of the invention understandable. This review should not be seen as comprehensive, and the reader is referred to the references cited herein as well as to other prior art documents. This review also should not be seen as limiting the invention to the particular examples and techniques described herein and in no case should the invention be limited except as described in the attached claims and all allowable equivalents.

Two earlier co-assigned U.S. applications, 08/276,742 now U.S. Pat. No. 5,825,978 issued Oct. 20, 1998 entitled METHOD AND APPARATUS FOR SPEECH RECOGNITION USING OPTIMIZED PARTIAL MIXTURE TYING $_{(287-41)}$ and 08/375,908 now U.S. Pat. No. 5,864,810 issued Jan. 26, 1999 entitled METHOD AND APPARATUS FOR ADAPTING A SPEECH RECOGNIZER TO A PARTICULAR SPEAKER $_{(287-40)}$, discuss techniques useful in speech encoding and recognition and are fully incorporated herein by reference.

For purposes of clarity, this discussion refers to devices, concepts, and methods in terms of specific examples. However, the method and apparatus of the present invention may operate with a wide variety of types of digital devices including devices different from the specific examples described below. It is therefore not intended that the invention be limited except as provided in the attached claims.

Basics of Encoding and Recognition

FIGS. 1A and 1B illustrate a basic process for encoding physical data, such as speech wave form data, into numerical values and then performing vector quantization (VQ) on those values. A physical signal 2 is sampled at some interval. For speech data, the interval is generally defined by a unit of time t, which in an example system is 10 milliseconds (ms). A signal processor 5 receives the physical data and generates a set of numerical values representing that data. In some known speech recognition systems, a cepstral analysis is preformed and an observed vector Xt (10) consisting of a set of cepstral values ($C_1$ to $C_{13}$) is generated for each interval of time t. In one system, each of the 13 values is a real number and may be represented in a digital computer as 32 bits. Thus, in this specific example, each 10 ms interval of speech (sometimes referred to as a frame) is encoded as an observed vector X of thirteen 32-bit values or 416 bits of data. Other types of signal processing are possible, such as, for example, where the measured interval does not represent time, where the measurement of the interval is different, where more or fewer values or different values are used to represent the physical data, where cepstral coefficients are not used, where cepstral values and their first and/or second derivatives are also encoded, or where different numbers of bits are used to encode values. In speech encoded for audio playback, rather than recognition, different coefficients are typically used.

In some systems, the Xt vectors may be used directly to transmit or store the physical data, or to perform recognition or other types of processing. In the system just described, transmission would require 416*100 bits per second (bps) or 41.6 kbps of continuous transmission time. Recognition system based on original full cepstral vectors often employ Continuous Density Hidden Markov Models (CDHMMs), possibly with the probability functions of each model approximated by mixtures of Gaussians. The 08/276,742 patent, incorporated above, discussed a method for sharing mixtures in such a system to enhance performance.

However, often it is desirable to perform further encoding of the vectors in order to reduce the number of bits needed to represent the vectors and in order to simplify further processing. One known method for doing this is called vector quantization, a type of which is shown in FIG. 1B.

Vector quantization (VQ) takes advantage of the fact that in most physical systems of interest, the values ($C_1$ to $C_{13}$) that make up a particular vector Xt are not independent but instead have a relationship one to another, such that the individual value of $C_3$ for example, will have some non-random correlation to other values in that vector.

VQ also takes advantage of the fact that in most physical systems of interest, not all possible vectors will be observed. When encoding human speech in a particular language for example, many ranges of vector values (representing sounds that are not part of human speech) will never be observed, while other ranges of vectors will be common. Such relationships can be understood geometrically by imagining a continuous 13-dimensional space, which, though hard to visualize, shares many properties with real 3-dimensional space. In this continuous 13-dimensional space, every possible vector X will represent a point in the space. If one were to measure a large number of X vectors for a physical system of interest, such as human speech in a particular language, and plot a point for each measured X, the points plotted in space would not be evenly or randomly distributed, but would instead form distinct clusters. Areas of space that represented common sounds in human speech would have many points while areas of space that represented sounds that were never part of human speech would have no points.

In standard VQ, an analogous procedure is used to plot clusters and use those clusters to divide the space into a finite number of volumes. In the 13-dimensional example described above, a sample of human speech data is gathered, processed, and plotted in the 13-dimensional space and 13-dimensional volumes are drawn around dense clusters of points. The size and shape of a particular volume may be determined by the density of points in a particular region. In many systems, a predetermined number of volumes, such as 256, are drawn in the space in such a way as to completely fill the space. Each volume is assigned an index number (also referred to as a codeword) and a "central" point (or centroid) is computed for each volume, either geometrically from the volume or taking into account the actual points plotted and finding a central point. The codewords, the descriptions of the volumes to which they relate, and the centroids to which they are mapped, are sometimes referred to in the art as a codebook. Some systems use multiple codebooks, using a separate codebook for each feature that is quantized. Some systems also use different codebooks for different speakers or groups of speakers, for example using one codebook or set of codebooks for male speakers and another for female speakers.

Once the volumes are determined from training data, new speech data may be encoded by mathematically plotting the 13 value vector in the 13-dimensional space, determining which volume the point falls in (or which centroid the point is closest to) and storing for that point the VQ index value (in one example, simply an 8-bit number from 0 to 255) for that volume, thus Xt is encoded as VQt. When it is time to unencode the data, the 8-bit VQ is used to look-up the centroid for that volume and the (416-bit) value of the centroid can be used as an approximation of the actual observed vector Xt. First and second derivatives can be computed from these decoded centroids or those values can initially be encoded and stored similarly to the centroids possibly using separate codebooks.

HMM-Based Signal Recognition

After the physical data is encoded, it may be presented to an automatic recognition system, such as a speech recognition system. State-of-the-art speech recognizers are based on statistical techniques, with Hidden Markov Models (HMMs) being the dominant approach. The typical components of a speech recognition and understanding system are the front-end processor, the decoder with its acoustic and language models, and the language understanding component.

The front-end processor typically performs a short-time Fourier analysis and extracts a sequence of observation (or acoustic) vectors. Many choices exist for the acoustic vectors, but the cepstral coefficients have exhibited the best performance to date. The decoder is based on a communication theory view of the recognition problem, trying to extract the most likely sequence of words $W=[w_1, w_2, \ldots, w_N]$ given the series of acoustic vectors X. This can be done using Bayes' rule:

$$\hat{W} = \mathrm{argmax}_W P(W|X) = \mathrm{argmax}_W \frac{P(W)P(X|W)}{P(X)}.$$

The probability P(W) of the word sequence W is obtained from the language model, whereas the acoustic model determines the probability P(W|X).

In HMM-based recognizers, the probability of an observation sequence for a given word is obtained by building a finite-state model, possibly by concatenating models of the elementary speech sounds or phones. The state sequence $S=[s_1, s_2, \ldots, s_T]$ is modeled as a Markov chain, and is not observed. At each state $s_t$ and time t, an acoustic vector is observed based on the distribution $b_{s_t}=P(X_t|s_t)$, which is called output distribution.

If the front-end processor quantizes the acoustic vectors as described above, the output distributions take the form of discrete probability distributions. If the acoustic vector generated is instead passed to the acoustic model before quantization, then continuous-density output distributions are used, with the multivariate-mixture Gaussians of the following form a common choice:

$$b_s(X_t) = \sum_{i=1}^{K} p(\omega_i|s) N(X_t; \mu_{si}, \Sigma_{si}),$$

where $p(\omega_i|s)$ is the weight of the i-th mixture component in state s, and $N(x; \mu, \Sigma)$ is the multivariate Gaussian with mean $\mu$ and covariance $\Sigma$. In work prior to the present invention, continuous-density HMMs (CDHMMs) with mixture components that are shared across HMM states were used because continuous density HMMs were generally believed to exhibit superior recognition performance over their discrete-density counterparts.

In CDHMM speech recognition, even with some mixture tying, it is known that computing probabilities can be extremely computationally intensive. While such systems have been shown to perform accurately, with recognition accuracy approaching 90–95% for a recognition vocabulary of five to twenty words, the amount of processing required has generally made them unsuitable for some applications.

Vector Quantized Speech Recognition

It is known that systems using VQ, however, can compute probabilities much more quickly, by using discrete HMMs. In a VQ system, a probability for each model ($P_{HMMn}$) can be computed during training for each centroid and stored in a table indexed by the VQ index. Determining the probabilities for a particular observed vector of speech then is reduced to determining the VQ index for that volume and looking up the probabilities in a table. While discrete HMM systems have been known to perform very quickly, their error rate is generally two times higher than the continuous-density HMMs and this high error rate is not acceptable in many applications.

The degradation in accuracy of the discrete-density HMMs can be attributed to the low resolution with which the space of observation features (the acoustic space) is represented. A typical discrete-density HMM uses a VQ codebook with 256 codewords to represent a 13-dimensional space. Increasing the codebook size is not a feasible solution: the computation and memory requirements of the vector quantizer are proportional either to the number of codewords, if a linear vector quantizer is used, or to their logarithm (i.e. the number of bits), when a tree-structured vector quantizer is used. Most significant, however, is the cost of storing the look-up tables with the precomputed probabilities. The number of parameters for a discrete-density HMM is proportional to the number of codewords in the quantizer. For medium to large vocabulary applications, there are millions of parameters in discrete-density HMMs, and hence increasing the codebook size is not a feasible solution.

One particular need for efficient, accurate speech recognition has arisen in the field of client/server recognition applications over a network such as the Internet (or WWW).

What is needed is a new type of encoding and modeling system for physical data such as speech that allows for efficient transmission of observed features and improved accuracy of recognition.

There is a voluminous scientific literature related to speech recognition, some of which is referenced in the previously cited co-assigned patents. Literature more directly related to aspects of the invention is listed below. The listing of a reference below is not to be construed as a statement by applicants that the reference constitutes prior art for the purposes of evaluation the patentability of the present invention.

[1] D. Goddeau, W. Goldenthal and C. Weikart, "Deploying Speech Applications over the Web," *Proceedings Eurospeech*, pp. 685–688, Rhodes, Greece, September 1997.

[2] L. Julia, A. Cheyer, L. Neumeyer, J. Dowding and M. Charafeddine, "http://www.speech.sri.com/demos/atis.html," Proceedings AAAI'97, Stanford, Calif., March 1997.

[3] E. Hurley, J. Polifroni and J. Glass, "Telephone Data Collection Using the World Wide Web," *Proceedings ICSLP*, pp. 1898–1901, Philadelphia, Pa., October 1996.

[4] S. Bayer, "Embedding Speech in Web Interfaces," *Proceedings ICSLP,* pp. 1684–1687, Philadelphia, Pa., October 1996.

[5] M. Sokolov, "Speaker Verification on the World Wide Web," *Proceedings Eurospeech,* pp. 847–850, Rhodes, Greece, September 1997.

[6] C. Hemphill and Y. Muthusamy, "Developing Web-Based Speech Applications," *Proceedings Eurospeech,* Rhodes, Greece, September 1997.

[7] The Aurora Project, announced at Telecom 95, "http://gold.ity.int/TELECOM/wt95", Geneva, October 1995. See also "http://fipa.comtec.cojp/fipa/yorktown/nyws029.htm".

[8] D. Stallard, "The BBN SPIN System", presented at the Voice on the Net Conference, Boston, Mass., September 1997.

[9] S. J. Young, "A Review of Large-Vocabulary Continuous-Speech Recognition," *IEEE Signal Processing Magazine,* pp. 45–57, September 1996.

[10] S. B. Davis and P. Mermelstein, "Comparison of Parametric Representations for Monosyllabic Word Recognition in Continuously Spoken Sentences," *IEEE Trans. Acoustics Speech and Signal Processing, Vol.* ASSP-28(4), pp. 357–366, August 1980.

[11] V. Digalakis and H. Murveit, "Genones: Optimizing the Degree of Mixture Tying in a Large Vocabulary Hidden Markov Model Based Speech Recognizer," *IEEE Trans. Speech Audio Processing,* pp. 281–289, July 1996.

[12] A. Gersho and R. M. Gray, *"Vector Quantization and Signal Compression,"* Kluwer Academic Publishers, 1991.

[13] J. Makhoul, S. Roucos and H. Gish, "Vector Quantization in Speech Coding," *Proceedings of the IEEE,* Vol. 73, No. 11, pp. 1551–1588, November 1985.

[14] P. Price. "Evaluation of spoken language systems: The ATIS domain," Proceedings of the Third DARPA Speech and Natural Language Workshop, Hidden Valley, Pa., June 1990, Morgan Kaufmann.

[15] "Quantization of Cepstral Parameters for Speech Recognition over the World Wide Web", V. Digalakis, L. Neumeyer and M. Perakakis, ICASSP'98.

[16] "Quantization of Cepstral Parameters for Speech Recognition over the World Wide Web", V. Digalakis, L. Newmeyer and M. Perakakis, Submitted to Journal of Selected Areas in Communications.

In references 15 and 16 listed above, some of the present inventors discussed and evaluated various coding techniques in order to transmit and recognize speech in a client-server speech recognition application over the World Wide Web (WWW) including approaches, such as linear and non-linear scalar quantization algorithms, and a more advanced algorithm that comprises a part of the present invention based on product codes.

SUMMARY OF THE INVENTION

The present invention in one embodiment includes a novel approach for encoding physical signals. A further embodiment includes a novel and improved approach for performing recognition on these encoded signals.

In one embodiment, the invention includes a method used to partition a recognition feature vector into a number of sub-vectors and a method for allocating available encoding bits among the subvectors. The invention, in one embodiment, uses an iterative approach in which codeword bits are assigned to the subvectors that result in the greatest increase in recognition accuracy.

In a further embodiment, the invention introduces a method for performing recognition effectively on encoded subvectors, with a recognition performance better than that of CDHMMs. In a further embodiment, the invention includes discrete subvector HMMs with product-code probabilities. In another embodiment, the invention includes discrete density subvector HMMs with mixtures.

The invention, in a specific embodiment, reduces the redundant and noisy information that state-of-the-art speech recognizers include in their representation of the speech signal. In some typical prior art systems, the 13 cepstral parameters are each represented by 32-bit floating point numbers (a total of 13×32=416 bits for each cepstral vector, and an additional 416 bits for first derivatives and an additional 416 bits for second derivatives in systems that encode one or both of those), and their statistical variation is modeled by Gaussian distributions. In one embodiment, the invention only requires 20 bits, rather than 416 bits, to transmit a vector, or 60 bits to transmit a vector and first and second derivatives. In a further aspect, the invention replaces the computation of Gaussian likelihoods with table lookups. This achieves a 60% reduction in computation time (a speed-up of more than a factor of two) while maintaining similar recognition accuracy to a CDHMM system.

The invention can thereby improve the efficiency and decrease the cost of many applications based on speech recognition. For example, by speeding up the recognition process, the recognizers will be able to handle larger vocabularies in real time applications. In another use of the invention, it is possible to increase the number of recognition processes that run on the same computer and are serviced by the same processor, since each recognizer will have smaller computational demands. As a result, the overall cost of a system, such as speech recognition WWW server, will be reduced.

In one experimental system, the time required for sentence recognition was reduced from 5.3 seconds for a Gaussian CDHMM system with mixtures to 2.3 seconds for a table look-up system. A system according to the invention would require just 5 table look-ups to determine primary feature probability (or 5*32 lookups with mixtures) compared to 13 Gaussian computations (or 13*32 Gaussian computations with mixtures) for a CDHMM system.

DESCRIPTION OF THE SPECIFIC EMBODIMENTS

Client/Server Speech Recognition

Figure 1A:
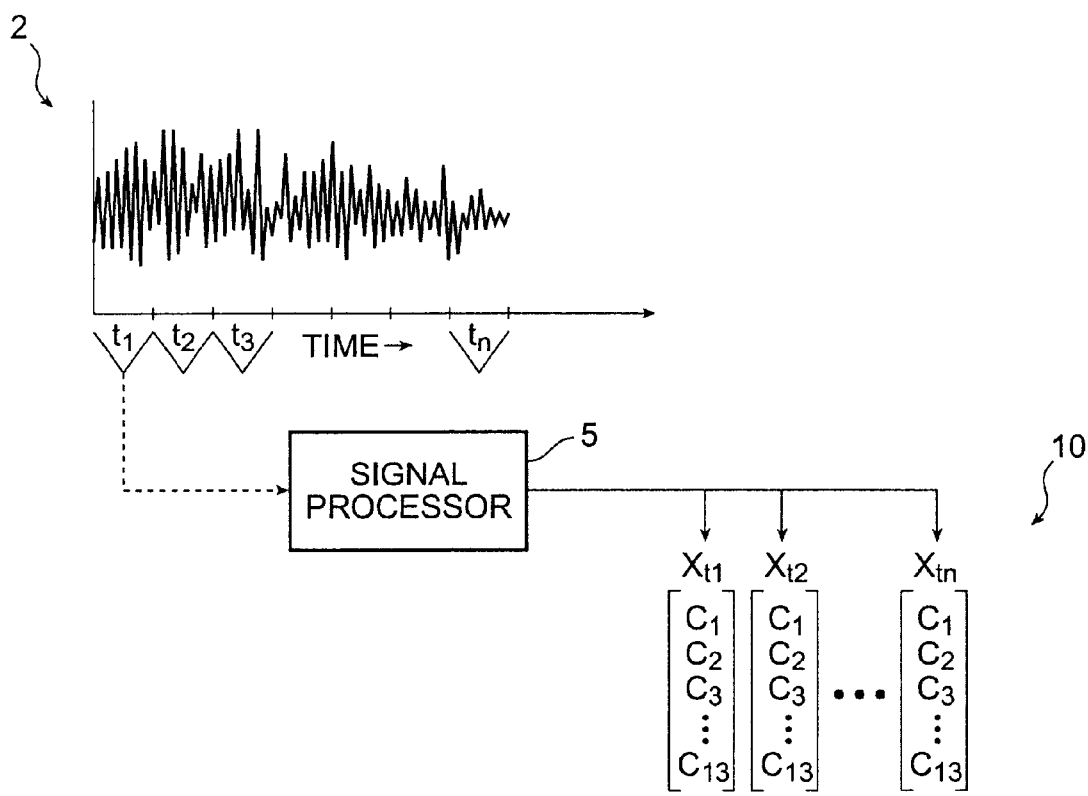
FIGS. 1A and 1B illustrate a basic process for encoding physical data, such as speech wave form data, into numerical values and then performing vector quantization (VO) on those values.
Figure 1B:
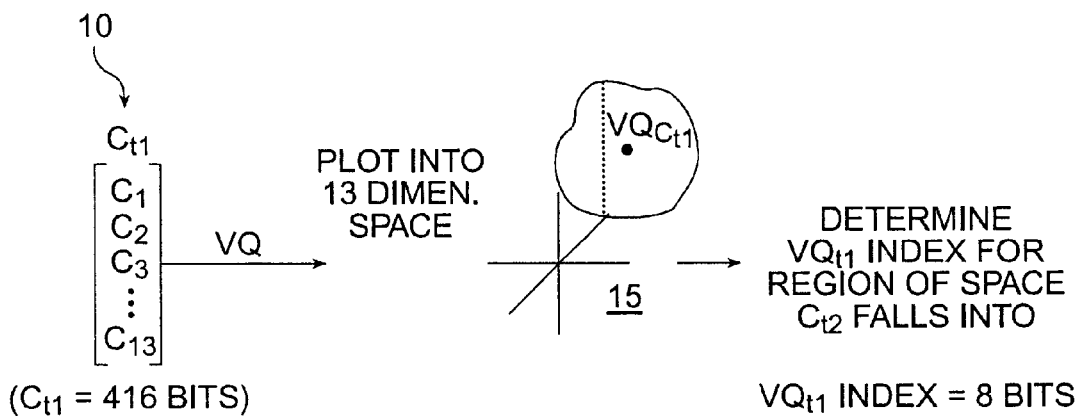

One embodiment and particular application of the invention, though not the only application, is in a client-server speech recognition system. In general, in such systems, the communication channel between the clients and the server will have limited bandwidth. The clients may be deployed on heterogeneous environments, such as personal computers, smart devices, and mobile devices. Speech is captured by the clients, and after some local processing, the information is sent to the server. The server recognizes the speech according to an application framework and sends the result string or action back to the client.

In one embodiment, the system uses two major speech technologies: speech recognition and speech coding. In a two-way-audio system, coding is used to present audio prompts to the user. Prior art coding techniques that emphasize the audio quality of digitally transmitted speech can be used to send the speech over low-bandwidth channels and produce perceptually acceptable speech to the user. The invention is novel primarily in the opposite path; that is, the speech data sent from the client (i.e. generally speech captured from a human user) to the server.

Traditional speech coding research focuses on the performance tradeoff between transmission rates and perceptual reproduction quality. The data compression problem for state-of-the-art HMM based speech recognition systems differs from the traditional speech coding problem in that the optimization criterion is recognition accuracy instead of perceptual quality of the reproduced data For that reason, some techniques used in reproduction encoding were believed not optimal for recognition.

Speech Recognition over the WWW

There are several alternative architectures for applications incorporating speech recognition technology on the WWW, three of which are outlined here. The first strategy is to perform no processing related to the recognition/ understanding process at the client side, but to simply transmit the user's voice (encoded digitally, possibly using reproduction encoding) to the server, and this strategy was employed in some prior WWW recognition systems. The second alternative is to perform most of the speech recognition processing at the client side, and then transmit recognition results to the server, but this limits the kinds of clients that can effectively be used and requires large recognition software engines to be running on each client. Finally, an intermediate solution is to do some front-end processing at the client and transmit only the information that the recognizer needs through the network channel to the server. Techniques of the present invention are particularly suited to a system using the intermediate solution.

Client-Server Processing

The client-server approach envisioned as an embodiment of the present invention is based on two key results: (1) Feature extraction is only a small part of the computation that takes place in a speech recognition and understanding application; and (2) Speech recognition needs only a small part of the information that the speech signal carries. The representation of the speech signal used for recognition concentrates on the part of the signal that is related to the vocal-tract shape.

The first result implies that the front-end processing (the feature extraction) can run at the client side on a much wider range of machines than the ones that will support the whole recognition process. There are additional advantages of client-server processing over the client-only model. The recognizer may need information that exists on the server side in order to guide the decoding process; this information would have to be transmitted to the client in the client-only model, something unnecessary in the client-server model, since the decoding takes place at the server side. To make speech recognition servers available from a variety of systems, front-end processing and compression can be standardized. Standard front-end modules can be installed on the client machines as a system resource, a Java applet, or a browser plug-in.

The second observation shows the advantage of client-server processing over the server-only model. Traditional speech coding focuses on the perceptual reproduction quality of the coded speech. As a result, the speech coder may transmit redundant information, and at the same time introduce noise to the features that are important in the recognition process because of bandwidth limitations. For recognition, the objective of the coding process should be recognition accuracy. If the information used by the recognition process is contained in a set of features, then only this set of features needs to be compressed and transmitted to the server.

Of course, encoding and transmitting only the front-end processed tokens can become a disadvantage because without any representation of the speech associated with these tokens, the tokens cannot be associated with the audio speech stream that generated them (referred to as labeling). As a result, it may not be possible to monitor in-service recognition performance, or to collect labeled speech data for development and performance improvement. To overcome this limitation, and collect labeled data during the initial deployment of the application, it is possible to transmit the original speech encoded using a very-low-bit-rate coder (just enough to allow a human listener to understand the speech) as side information. This side information can be transmitted along with the encoded front-end tokens during the development phase only. The client-server system just discussed can be applied to the Internet, as well as to wireless channels.

Coding Feature Vectors as Sub-Vectors

Figure 2:
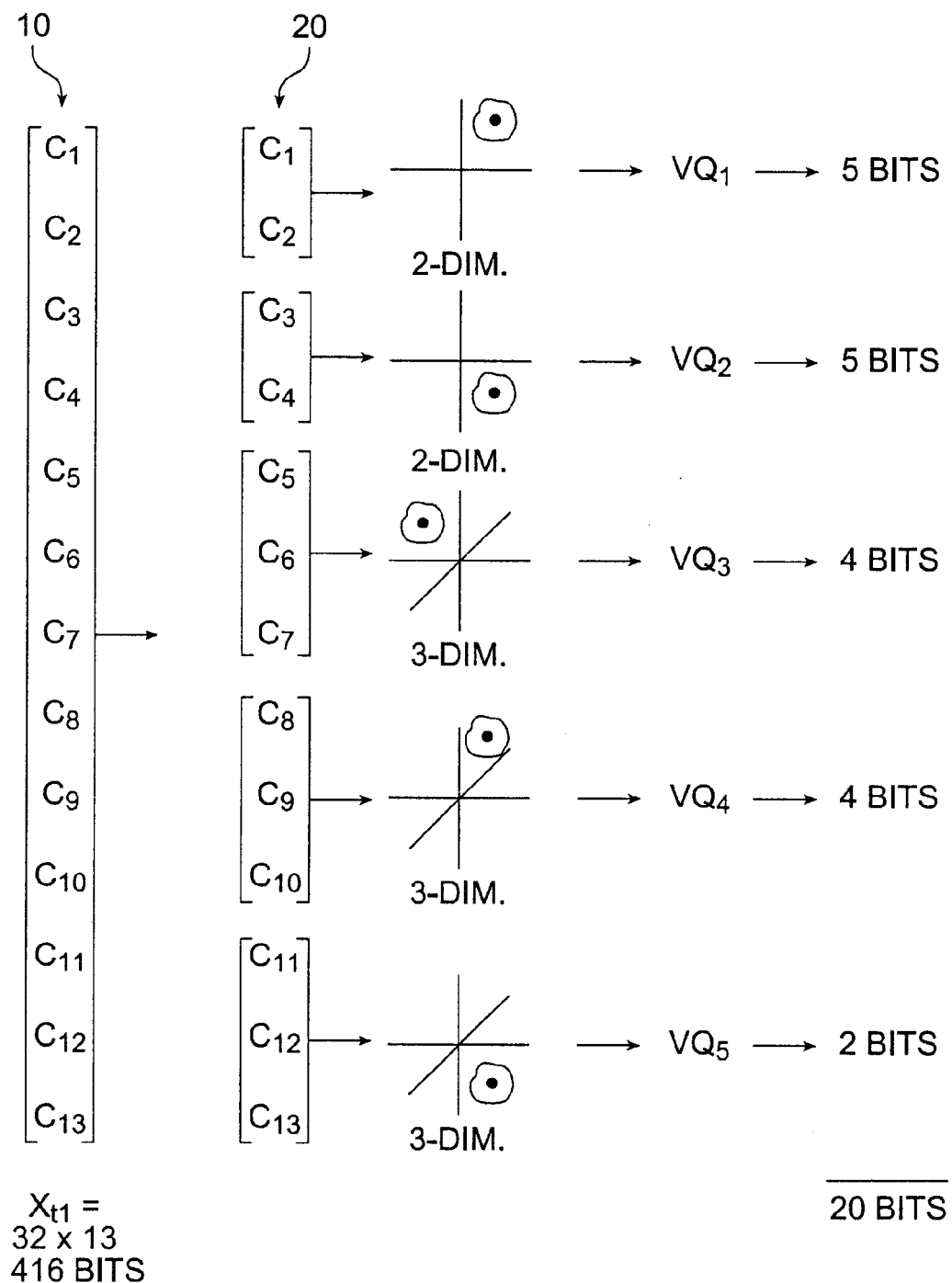
FIG. 2 illustrates a representative example method of partitioning a recognition vector into a number of subvectors and performing vector quantization.
Figure 3A:
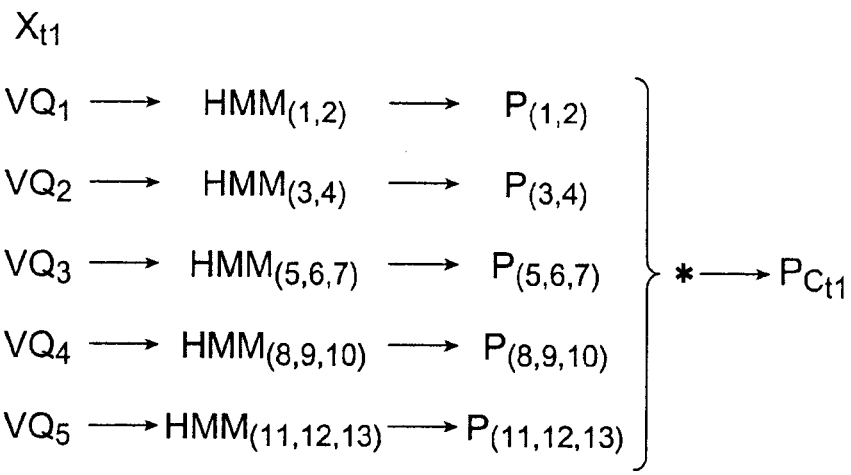
FIG. 3A illustrates a representative example method of performing recognition on subvector indexes to obtain subvector probabilities.
Figure 3B:
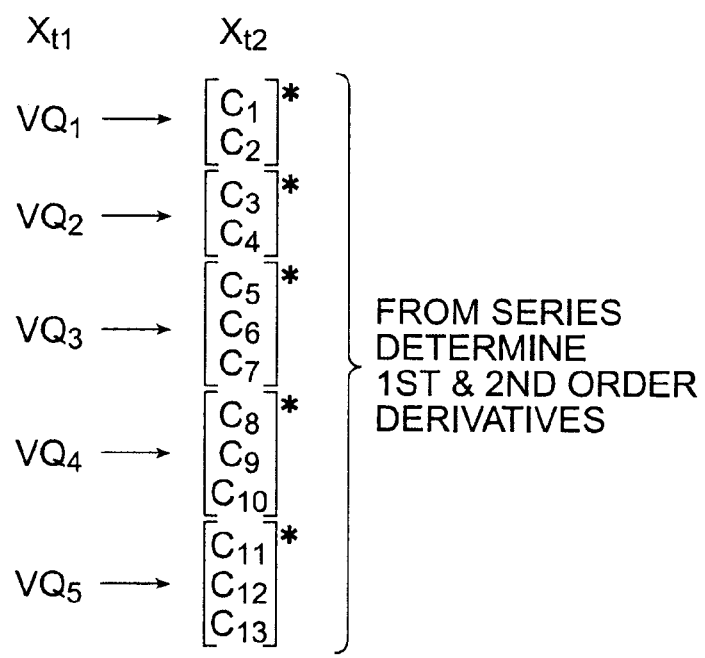
FIG. 3B illustrates an optional further method of obtaining secondary features after reconstructing centroids.

To improve the resolution with which the acoustic space is represented, without the significant costs incurred by increasing the vector codebook size; the invention in one embodiment employs subvector quantization of observation values. In one embodiment, these values are the cepstral coefficients and possibly also their first and second derivatives. Subvector quantization is known for audio reproduction of speech signals, but it is believed it has not been employed for speech recognition. This procedure is shown in a representative example in FIG. 2, wherein a recognition vector 10 is first partitioned into a number of subvectors. In this specific example, five subvectors are used, with the first two being two-dimensional subvectors and the remaining three being three-dimensional. In an alternative embodiment, fifteen subvectors could be used, five for the primary values, and the remaining ones for first and second derivatives.

The subvectors are encoded using separate codebooks, in the illustrated example five codebooks, the first two being two-dimensional and remaining three, three-dimensional. The total number of codewords that represent the acoustic space is the product of the number of codewords used for the representation of each subvector, in the case shown in FIG. 2, 32*32*16*16*4=1,048,576 and this type of subvector quantization is sometimes referred to as product code vector quantization.

In one embodiment, the subvectors are encoded at the client side, transmitted through the network, and then mapped to their centroids at the server. These centroids are then the input to the recognition process, which may be a CDHMM process. Employing subvector quantization of the cepstral coefficients has the following benefits:

The acoustic space may be represented with a high resolution, while keeping the computational and memory requirements of the quantizer low.

The centroids of the product-code can be used, if desired, as input to a CDHMM recognizer at the server.

It is not necessary to transmit secondary features, like first and second-order derivatives, because secondary features can be reconstructed at the server from the centroid series. However, transmission of secondary features is an option and a preferred embodiment for some applications.

According to various embodiments of the invention, different numbers of subvectors can be used for the same values. Experiments have been performed beginning with the extreme case where the subvectors each consist of single cepstral coefficients, in the art sometimes referred to as scalar quantization. The numbers of bits used to encode the coefficients (or quantization levels) may use either uniform or non-uniform. In the latter case, the quantization levels are matched to the statistics of the coefficient that is being quantized. In the non-uniform quantization scheme, the empirical distribution function as an optimal companding function is used, since the random variable $Y=F_x(X)$ obeys a uniform distribution. The empirical distribution can be estimated by using a large number of utterances from different speakers.

In the more general case, the dimensions of the subspaces used in the product code are larger than one. Although more complex variations of product codes could be used, in one embodiment the invention uses partitioned VQ, where the cepstral vector is divided into two or more non-overlapping subvectors.

Determining Subvector Quantization Levels

Once the subvectors of the product code are formed, the next important design question is how to allocate the bits among the respective codebooks. Because the invention is interested in coding speech features for recognition, in one embodiment it includes an automatic bit-allocation algorithm that uses the word-error rate as a metric. Specifically, the invention starts with an initial bit allocation to subvectors, and then increases the bit rate by adding bits to the subvectors that yield the maximal incremental increase in recognition performance as follows:

Initialization: Allocate the initial number of bits to subvectors and evaluate speech recognition performance. Set this as the current configuration.

Step 1: For each subvector, increase its allocated number of bits by one and evaluate speech recognition performance, keeping the number of bits assigned to each of the remaining subvectors as in the current configuration. Assign the additional bit to the subvector that resulted to the maximal increase in recognition performance, and set the new assignment as the current configuration.

Step 2: If the desired recognition performance has been achieved, or the maximum available bit rate has been reached, stop. Otherwise, go to step 1.

Any available metric can be used to evaluate speech recognition performance. In one embodiment the invention uses the word-error rate (WER), which is the percentage of words that were 'erroneously' recognized (i.e., the recognizer has added, deleted or replaced some of the words that have been spoken in the initial sentence). Thus:

$$WER = \frac{INS + DEL + SUB}{TOTAL} \times 100\%.$$

Although the above procedure is computationally expensive, due to the multiple recognition experiments that must be run at each step, it is only executed once during the initial design of the quantizer. If, however, a faster allocation scheme is desired, the total assigned bits in the second step can be incremented in steps of multiple bits.

Using Discrete-density Mixture HMMs for More Efficient Recognition

The previous section described an embodiment in which once the VQ subvector indices were received and ready to be processed, these indices were used to generate high-resolution 13-dimensional reconstructions of each observed vector and those reconstructions and derived secondary features could then be used to compute probabilities for speech recognition possible using CDHMMs, CDHMMs with mixture tying, or other high-computation recognition systems.

A further embodiment of the invention, however, achieves a surprising and substantial speed-up in recognition performance by computing probabilities for HMMs for subvector centroids separately during initial system training, in a way similar to discrete HMMs. The probabilities that are computed and stored are not of observed vectors themselves, but of the different subvector parts of observed vectors, and these subvector probabilities are in fact shared or tied over many different observed vectors. These sub-vector probabilities are stored in a table at the recognition engine (in a client/server system at the server side) according to subvector indices in separate codebooks for each subvector. According to this embodiment, determining the probability for a particular model for a particular observed vector requires looking up the subvector probabilities in the different subvector codebooks for that model and then multiplying those subvector probabilities to achieve the vector probabilities. Thus, in the system shown in FIG. 2, five table lookups and a multiplication are required to determine a probability for a model. In an alternative system, where additional first and second derivatives are encoded as five subvectors, a total of fifteen table lookups are required.

Optimizations are possible where different subvectors receive different weightings or where a multiplication is not performed if a certain sub-probability is very low. By dividing the probability table into several subvector tables during training and recognition, substantial savings are possible in terms of table size. In the specific example shown in FIG. 2, for example, performing training and recognition in a single table for a 20-bit vector code would require 32*32*16*16*4=1,048,576 table entries for each MM. Performing training and recognition according to the invention, by contrast, requires just 32+32+16+16+4=102 table entries for each HMM. Experimental work has shown that, contrary to some expectations, a high level of recognition accuracy can be achieved using this approach. Surprisingly, discrete density subvector HMMs according to an embodiment of the invention, have been shown to perform better than CDHMMs and with substantially less computation required.

In a further embodiment, the invention may include discrete subvector HMMs with mixtures to improve recognition performance. Mixtures are known in the art as a way to improve recognition performance by allowing automatic mathematical clustering of training data into different codebooks (for example, training data for males and females may have very different characteristics). Mixtures have previously been used in CDHMMs such as described in the co-assigned patents referenced above, though they have not been used in discrete HMMs because the low resolution with which the observation vectors were represented in previous discrete HMMs did not require elaborate modeling.

One embodiment of the invention incorporates mixtures into discrete subvector HMMs to substantially improve recognition performance. Because of the efficiency of the subvector discrete HMM recognition according to the present invention, mixtures can be introduced without as substantial a computation cost as for other recognition systems.

According to an embodiment incorporating mixtures, the recognition equation will have a form near:

$$P_s(X_t) = \sum_{i=1}^{32} \lambda_i \cdot P_{si}(VQ_1 = k_1) \cdot P_{si}(VQ_2 = k_2) \cdot$$
$$P_{si}(VQ_3 = k_3) \cdot P_{si}(VQ_4 = k_4) \cdot P_{si}(VQ_N = k_N)$$

where $P_s(X_t)$ is the probability for a particular model state s that $X_t$ was produced by that state, $\Xi_i$ is the weight of the i-th mixture component, $k_l$ is the codebook index observed at time t for the first subvector, and $P_{si}(VQ_l=k_l)$ is the probability that the first subvector index is $k_l$, derived from a table lookup for this model state and mixture component i.

In some applications, it is desirable to have first and second order derivatives present at the server during recognition. In one embodiment, this may be accomplished by encoding those values at the client and transmitting them along with the subvector indices. In an alternative embodiment, approximate observed vectors are derived from the subvector indices at the server and are used to determine first and second order derivatives, while initial probabilities are derived by the table look-ups just described.

Computing Initial Probabilities From Training Data For Discrete HMMs

In order to create a set of recognition codebooks (in this case, tables of values indexed by VQ index) to be used in the equations shown above, the invention in another aspect includes a modification to the well-known forward-backward algorithm. The parameters of the discrete-mixture HMM models can be estimated automatically from speech data using the iterative method that we describe below.

1. Initialize the parameters of all the discrete-mixture HMMs to some arbitrary values.
2. Perform an iteration of the well-known forward-backward algorithm on the training speech data and compute the quantities for every state s and mixture component i and at every frame t $$\gamma_t(s, i) = \frac{\alpha_t(s)\beta_t(s)}{\sum_{s'} \alpha_t(s')\beta_t(s')} \cdot \frac{\lambda_i \cdot P_{si}(VQ_1 = k_1) \cdot P_{si}(VQ_2 = k_2) \cdot P_{si}(VQ_3 = k_3) \cdot P_{si}(VQ_4 = k_4) \cdot P_{si}(VQ_N = k_N)}{\sum_{j=1}^{32} \lambda_j \cdot P_{sj}(VQ_1 = k_1) \cdot P_{sj}(VQ_2 = k_2) \cdot P_{sj}(VQ_3 = k_3) \cdot P_{sj}(VQ_4 = k_4) \cdot P_{sj}(VQ_N = k_N)}$$

where the quantities $\alpha_t(s), \beta_t(s)$ are the alpha and beta probabilities that are computed with the forward-backward algorithm, and the probabilities of the subvectors are computed using the previous estimates of the model parameters.

3. Compute new estimates for the subvector probabilities using the following formula:

$$P_{si}(VQ_1 = k_1) = \frac{\sum_{\substack{\text{Times } t \text{ where} \\ \text{index of first} \\ \text{subvector is } k_1}} \gamma_t(s, i)}{\sum_{\text{Times } t} \gamma_t(s, i)}$$

Update similarly the probabilities of all the subvectors for all states s and mixtures i.

4. Replace the previous values of the subvector probabilities with the new estimates. If a predefined convergence criterion is not met, go to step 2 and repeat.

EXPERIMENTAL RESULTS

Experimental Results

In experimental work performed during development of the invention, we followed the client-server model using just the encoding scheme described above and initially with CDHMM recognition. We implemented a highly modular signal processing front-end in Java to compute the cepstral coefficients and encode the parameters. We verified that the system is fast enough to handle the feature extraction in real-time using a Pentium 166 Mhz computer and a Java virtual machine (JVM) with a just-in-time (JIT) compiler and ran benchmarks to compare performance on the computation of the fast Fourier transform. We found that the optimized C code is twice as fast as the Java implementation. We believe that as the JVMs become more efficient the gap between C and Java performance will become even smaller. The Java applet is downloaded from the server. By default, the Java security model prevents an applet from accessing native resources. There are various possible approaches to grant permission to access native resources.

Coding Of Cepstral Features

For the client-server approach, we determined, as discussed above, that we needed only to transmit the set of coefficients that will be used in recognition. Mel frequency-warped cepstral coefficients (MFCCs) constitute the set of features used by most state-of-the-art HMM-based speech recognizers today. We used typical choices of 13-dimensions for the feature vector computed 100 times per second.

To experiment with the quantization of cepstral parameters for speech recognition over the WWW, we used the air-travel information (ATIS) domain. In ATIS, a user can get flight information and book flights across the United States using natural language. ATIS consists of a vocabulary of approximately 1,500 words and has moderate perplexity (a measure of difficulty). ATIS is the domain of the first speech-enabled application over the WWW developed at SRI International. Both high-quality and toll-quality data are available for the ATIS domain, which allowed us to compare the server-only architecture, which uses toll-quality speech, with the client-server model that can use high-quality data.

Baseline and Speech-Encoding Performances

The recognizer used throughout the early experiments was SRI's DECIPHER™ speech-recognition system. It uses continuous-mixture density HMMs, with Gaussians that are shared across acoustically similar states. The signal processing consists of a filterbank-based front end that generated six feature streams: the cepstrum, the cepstral energy, and their first- and second-order derivatives. Eight cepstral coefficients were used for telephone-quality speech, whereas for high-quality data we increased this number to thirteen. The coefficients were computed at a rate of 100 times per second.

A bigram language model was used throughout our experiments. The performance of the baseline recognizer high-quality speech was evaluated at 6.55% WER using a test set of 34 male and female speakers with 400 utterances. Although not directly comparable, since it was evaluated on a different set of speakers than the high-quality baseline, the performance on telephone-quality (64 kbps) speech is significantly lower, measured at 12.7% WER. Compared with the telephone-quality baseline, the recognition performance did not degrade when the data was encoded using the G721 32-kbps ADPCM (Adaptive Differential Pulse Code Modulation) standard. However, when speech was encoded with the full-rate RPE-LTP GSM (Regular Pulse Excited linear predictive coding with Long-Term Predictor, General System for Mobile communications) 13-kbps speech encoder used in cellular telephony, the WER increased to 14.5%. These results indicate the recognition performance of the server-only model for bit rates ranging between 13 kbps (WER=14.5%) and 64 kbps (WER=12.7%).

Scalar Qantization Performance

We first quantized the cepstral coefficients of telephone-quality speech by using scalar quantization (with each of 13 coefficients encoded separately), and evaluated the recognition performance for various numbers of bits per coefficient. We investigated both uniform and non-uniform quantization. In the non-uniform quantization scheme, the empirical distribution was estimated by using 800 utterances from a different set of speakers than those included in the test set. These results are summarized in Table 1.

We determined that recognition performance is essentially flat for 4 to 8 bits per cepstral coefficient, and starts to degrade for lower numbers of quantization levels. Although we use a very simple quantization scheme, the WER of 13.2% at 3.6 kbps is significantly better than the GSM performance, although the latter used a bit rate that was four times higher. In addition, we see that the non-uniform quantization outperforms the uniform quantization significantly, especially at low numbers of bits per cepstral coefficient.

TABLE 1

Bit rates and word-error rates for scalar quantization of cepstral coefficients in telephone-quality speech.

| | | Word-Error Rate (%) | |
|---|---|---|---|
| Bits/Coef. | Bit Rate (kbps) | Uniform | Non-uniform |
| 8 | 7.2 | 12.55 | 12.82 |
| 7 | 6.3 | 12.65 | 12.87 |
| 6 | 5.4 | 13.08 | 12.65 |
| 5 | 4.5 | 13.14 | 13.62 |
| 4 | 3.6 | 17.43 | 13.19 |
| 3 | 2.7 | 45.47 | 14.64 |
| 2 | 1.8 | 108.9 | 21.07 |

A significant advantage of running the front end at the client side, however, is that can use the high-quality front end that uses a higher sampling rate and a larger number of bits per waveform sample. The baseline performance for the high-quality front end is 6.55% WER. In Table 2, we present the recognition results for scalar quantization of the cepstral coefficients of a high-quality front end. Although the bit rates are slightly increased when compared to the telephone-quality front end, because of the larger number of cepstral coefficients used, the recognition performance is significantly better at comparable bit rates. For example, transmission of the high-quality cepstral coefficients at 3.9 kbps yields a WER of 6.88%, whereas transmission of the toll-quality coefficients at 3.6 kbps resulted in a 13.19% WER. When compared to the server-only processsing model using GSM encoding, the performance improvement is even bigger: we get less than half the error rate (6.88% vs. 14.5%) at less than a third bits per second (3.9 kbps vs. 13 kbps).

TABLE 2

Bit rates and word-error rates for scalar quantization of cepstral coefficients in high-quality speech.

| | | Word Error Rate (%) | |
|---|---|---|---|
| Bits/Coef. | Bit Rate (kbps) | Uniform | Non-uniform |
| 8 | 10.4 | 6.65 | 6.53 |
| 7 | 9.1 | 6.76 | 6.40 |
| 6 | 7.8 | 6.65 | 6.43 |
| 5 | 6.5 | 6.96 | 6.32 |
| 4 | 5.2 | 6.96 | 6.32 |
| 3 | 3.9 | 12.45 | 6.88 |
| 2 | 2.6 | 95.43 | 9.04 |

Product-Code Quantization Performance

In the previous section, we encoded the cepstral coefficients using scalar quantization with a constant number of bits per coefficient. In this section, we present our experiments using product code VQ (PCVQ) with a variable number of bits per subvector. In all our experiments, the codebooks for each subvector were estimated by running the generalized Lloyd algorithm on the same 800 utterances that were used to estimate the empirical distribution in the non-uniform scalar quantization experiments. The codebooks were initialized using binary splitting.

We first compared two alternative approaches for partitioning the cepstral coefficients into subvectors: a correlation-based approach with subvectors at {(1,5), (3,9, 12,13), (4,6), (2,7,11), and (8,10) and a knowlege-based approach with the subvectors shown below. The knowledge-based approach exhibited better performance at all bit rates and was the approached used for the rest of the experiments.

In Table 3 we present, for the case of five subvectors, the WERs at various bit rates, as we measured them at various stages of the bit-allocation algorithm. The five subvectors consisted of the cepstral coefficients {(1,2), (3,4), (5,6,7), (8,9,10), (1 1,12,13)}. The product-code VQ achieved the WER of unquantized speech with just 2000 bps.

TABLE 3

Bit rates and word-error rates for product-code VQ using 5 subvectors.

| Bit Rate (bps) | Word-Error Rate (%) |
|---|---|
| 1400 | 11.71 |
| 1600 | 9.30 |
| 1800 | 8.10 |
| 1900 | 6.99 |
| 2000 | 6.63 |

We then examined the behavior of the bit-allocation algorithm for various numbers of subvectors in the product-code VQ. In Table 4 we present the case of five subvectors. The initial bit rate was 1200 bps, and the algorithm was initiated by distributing twelve bits to the five subvectors, as shown in the first row of Table 4. The algorithm proceeds incrementally starting of an initial allocation of a few bits and increasing the number of bits. The table shows only the best line (in terms of WER) among the possible choices for each bit total, which is also the initial point for the next iteration. To speed up the process, the number of allocated bits was increased by a step of two bits in the first iterations of the algorithm (until 1800 bps), and by a single bit in the latter stages of the algorithm. We can see that the initial WER of 16.79% decreases very rapidly and approaches the unquantized-speech performance at 2000 bps. The significance of the low-order coefficients is also obvious: The additional bits are allocated to the low-order subvectors first, and the final bit allocation uses more bits for the first two subvectors, although they are composed of only two coefficients each.

TABLE 4

Progression of the bit-allocation algorithm for the case of five subvectors

| Total bits | Composition of subvectors by MFCC coefficients | | | | | Bit Rate (bps) | Word-Error Rate (%) |
|---|---|---|---|---|---|---|---|
| | 1, 2 | 3, 4 | 5, 6, 7 | 8, 9, 10 | 11, 12, 13 | | |
| | Number of bits assigned to each subvector at each iteration | | | | | | |
| 12 | 3 | 3 | 2 | 2 | 2 | 1200 | 16.79 |
| 14 | 5 | 3 | 2 | 2 | 2 | 1400 | 11.71 |
| 16 | 5 | 3 | 4 | 2 | 2 | 1600 | 9.30 |
| 18 | 5 | 3 | 4 | 4 | 2 | 1800 | 8.10 |
| 19 | 5 | 4 | 4 | 4 | 2 | 1900 | 6.99 |
| 20 | 5 | 5 | 4 | 4 | 2 | 2000 | 6.63 |

The bits assigned to each subvector, the total bit rate, and the corresponding word-error rate are shown at intermediate steps of the algorithm. The same algorithm can be used to assign a variable number of bits to each coefficient in the non-uniform scalar quantization, since it is a special case of product-code VQ with single-element subvectors. The progression of the algorithm in this case is shown in Table 5. The initial bit rate was 1700 bps by assigning 17 bits to the 13 coefficients, as shown in the first row of Table 5. The algorithm was sped up by increasing the number of bits at each step by two, and by assigning them to the two coefficients that decreased the WER the most. In this case, rates of at least 2600 to 2800 bps are required before the unquantized-speech performance is reached. The final bit allocation uses three bits for the first four cepstral coefficients, and two bits for the remaining coefficients.

coefficient. The partitioning of cepstral coefficients into subvectors for the case of five subvectors was given above, whereas for the case of three subvectors, the partitioning was {(1,2,3), (4,5,6,7,8), (9,10,11,12,13)}. Scalar quantization with a variable number of bits demonstrates significantly better performance than the scalar quantization scheme with a fixed number of bits per coefficient, reducing the WER to 6.81% from 9.04% at 2600 bps. Product code VQ, however, performs significantly better than scalar quantization at any bit rate. When comparing the three- and five-subvector cases, we see that they behave similarly for low bit rates (below 1800 bps), but then the five-subvector scheme converges faster to the unquantized speech performance.

Using the server-only model with GSM encoding of speech, a performance of 14.5% WER was achieved at a bit-rate of 13 kbps. However, using the client-server model, for encoding MFCCs resulted in a much lower error rate—6.5% WER-since a high-quality front end can be used at the client side. This improvement in performance also comes at a fraction of the bit rate required for GSM encoding. A bit rate of 3900 bps is required when non-uniform scalar quantization with a constant number of bits per coefficient is used. This rate is reduced to 2800 bps with non-uniform scalar quantization with variable number of bits per coefficient, and to just 2000 bps when product-code vector quantization is used.

Other techniques, like predictive VQ, can be used to reduce the bit rate by taking advantage of the high correlation across time that cepstral vectors exhibit. However, other aspects of the problem must be considered, such as the computational complexity of the encoder, which in our case runs at the client side. The free nature of the Internet may limit the amount of encoding one can do. A wireless personal digital assistant (PDA) may be more likely to benefit from more encoding time and less transmission time, in which case the product-code VQ at 2 kbps may be required. Other types of clients may benefit more from the simplicity of the scalar quantization and transmit at 2800 bps.

Further recognition improvement

Table 6 shows the WER, the recognition time (on a 233 MHz Pentium II), and the process memory requirements, for the baseline CDHMM and the discrete-mixture HMMs

TABLE 5

Progression of the bit-allocation algorithm for the case of scalar quantization (13 subvectors). The bits assigned to each coefficient, the total bit rate, and the corresponding word-error rate are shown at intermediate steps of the algorithm.

| Total bits | MFCC coefficient index | | | | | | | | | | | | | Bit Rate (bps) | Word-Error Rate (%) |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | | |
| | Number of bits assigned to each coefficient at each iteration | | | | | | | | | | | | | | |
| 17 | 2 | 2 | 2 | 2 | 1 | 1 | 1 | 1 | 1 | 1 | 1 | 1 | 1 | 1700 | 12.78 |
| 18 | 3 | 2 | 2 | 2 | 1 | 1 | 1 | 1 | 1 | 1 | 1 | 1 | 1 | 1800 | 10.66 |
| 20 | 3 | 3 | 2 | 3 | 1 | 1 | 1 | 1 | 1 | 1 | 1 | 1 | 1 | 2000 | 8.69 |
| 22 | 3 | 3 | 3 | 3 | 1 | 2 | 1 | 1 | 1 | 1 | 1 | 1 | 1 | 2200 | 7.67 |
| 24 | 3 | 3 | 3 | 3 | 2 | 2 | 1 | 1 | 1 | 1 | 1 | 2 | 1 | 2400 | 6.99 |
| 26 | 3 | 3 | 3 | 3 | 2 | 2 | 1 | 1 | 2 | 1 | 2 | 2 | 1 | 2600 | 6.81 |
| 28 | 3 | 3 | 3 | 3 | 2 | 2 | 1 | 2 | 2 | 2 | 2 | 2 | 1 | 2800 | 6.71 |
| 30 | 3 | 3 | 3 | 3 | 2 | 2 | 2 | 2 | 2 | 2 | 2 | 2 | 2 | 3000 | 6.55 |

Figure 4:
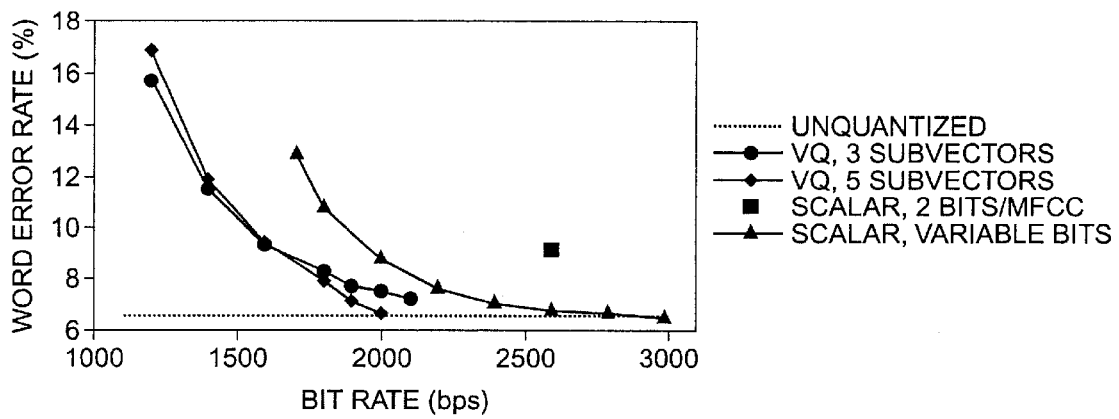
FIG. 4 illustrates speech recognition performance as a function of the bit rate for different numbers of subvectors in the product-code VQ (three and five) in a specific embodiment of the invention.

FIG. 4 illustrates speech recognition performance as a function of the bit rate for different numbers of subvectors in the product-code VQ (three and five), and for the non-uniform scalar quantization with a variable number of bits per coefficient. In the same figure, we also show the WER for non-uniform scalar quantization using two bits per encoding 39 values as different number of subvectors. Our experimental results show that in this embodiment, the invention achieves a recognition speedup of a factor of 2.5 (or a reduction in time of 60%) maintaining the same recognition performance. In this embodiment, the discrete-mixture HMMs have increased memory requirements, as is also shown in the table.

TABLE 6

| SYSTEM | WER (%) | TIME (secs/ sent.) | Time Speed-up (%) over CDHMM | MEMORY (MB) |
|---|---|---|---|---|
| CDHMM | 6.60 | 5.25 | — | 27.0 |
| Discrete, 39 subvectors | 6.32 | 2.61 | 50.3 | 45.8 |
| Discrete, 24 subvectors | 6.38 | 2.36 | 55.0 | 43.7 |
| Discrete, 15 subvectors | 6.63 | 2.21 | 58.0 | 57.7 |
| Discrete, 9 subvectors | 6.53 | 2.13 | 59.5 | 150.2 |

Figure 5:
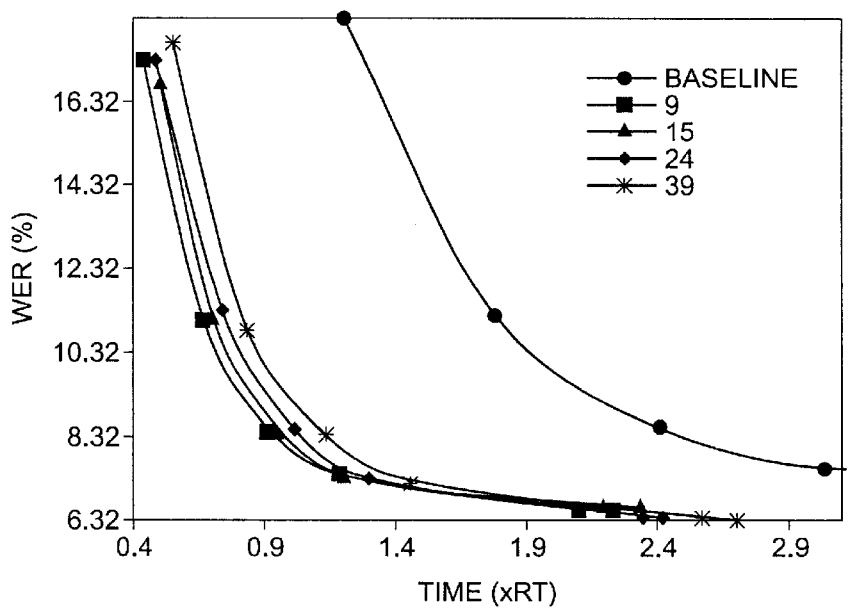
FIG. 5 illustrates speech recognition performance as a function of the bit rate for different numbers of subvectors in the product-code VQ in a different embodiment of the invention.

FIG. 5 shows the same systems, operating at different points in terms of WER-speed trade-offs. The closer the curves to the lower left point the better, since we get low error rates at faster speeds. The superior performance of the discrete-mixture HMMs over CDHMMs is also demonstrated in this figure.

The invention has now been explained with reference to specific embodiments. Other embodiments will be apparent to those of skill in the art. In particular, specific processing orders have been described and functions have been described as being in particular orders, however, many of these sub functions could be differently arranged without changing the essential operation of the invention. It is therefore not intended that this invention be limited, except as indicated by the appended claims and all allowable equivalents.

What is claimed is:

1. A system for assigning codeword bits among a number of feature vectors to be used in automatic recognition comprising:

a front end encoder for receiving a physical signal;

a feature extraction engine for converting said signal into a series of digitally encoded numerical feature vectors, said feature vectors selected in order to perform recognition, each of said feature vectors comprising at least two separable numerical parameters;

a subvector quantizer for dividing said feature vectors into a number of subvectors and for performing vectors quantization on said subvectors based a first assignment of bit numbers to each subvector in order to assign a codeword to each subvector to approximate said each subvector, a recognition engine for performing recognition using said codewords representative of said quantized subvectors to produce a sequence of labels;

memory for storing a plurality of statistical models with trained parameters;

a tester for measuring recognition performance based on comparison of said labels with the corresponding pre-transcribed labels of said physical signal from a development set of the tester; and feedback means from said tester to said subvector quantizer, for feeding back performance criteria;

wherein said subvector quantizer is further operative in response to said performance criteria to assign additional bits to said subvectors incrementally until the desired level of recognition performance is reached or a threshold of assigned bits is reached.

2. The system according to claim 1 wherein said stored statistical models are associated with a subunit of speech and represent that subunit of speech as a plurality of states, each state having associated with it a probability function, the probability functions having parameters determined from training data, the probability function producing a probability that a given set of speech data is representative of that particular state, the recognized known labels comprising words in the recognition database.

3. The method according to claim 2 wherein the probability functions are stored in the system as a mixture of simple probability functions.

4. The system according to claim 3 wherein the simple probability functions are discrete pre-computed probability values retrieved by a table look-up.

5. The system according to claim 3 wherein the simple probability functions are Gaussians.

6. The system according to claim 5 wherein the speaker independent probability functions are mixtures of Gaussians having the form $$p_{SI}(y_t|s) = \sum_i p(\omega_i|s_t) N(y_t; \mu_{ig}, \Sigma_{ig}).$$

7. The system according to claim 1 wherein each of said stored statistical models is associated with a subunit of speech.

8. A recognition system for automatically recognizing physical signals and deriving known labels comprising:

a front end encoder for receiving a physical signal;

a feature extraction engine for converting said signal into a series of digitally encoded numerical feature vectors, said vectors selected in order to perform recognition, each of said vectors comprised of at least two separable numerical parameters;

a subvector quantizer for separating said feature vectors into at least two subvectors and for determining a codeword for each subvector to approximate said subvector;

a channel for transmitting codewords for said subvectors to a recognition engine;

memory for storing a plurality of statistical models with trained parameters; and a recognition engine capable of using said stored statistical models to recognize known labels from a set of unidentified feature vectors wherein said recognition engine performs vector quantized subvector recognition using discreet HMMs having the form:

$$P_s(X_t) = \sum_{i=1}^{32} \lambda_i \cdot P_{si}(VQ_1 = k_1) \cdot P_{si}(VQ_2 = k_2) \cdot$$
$$P_{si}(VQ_3 = k_3) \cdot P_{si}(VQ_4 = k_4) \cdot P_{si}(VQ_N = k_N)$$

where $P_s(X_t)$ is the probability for a particular model state s that $X_t$ was produced by that state, $\lambda_i$ is the weight of the i-th mixture component, $k_l$ is the codebook index observed at time t for the first subvector, and $P_{si}(YQ_l=k_l)$ is the probability that the first subvector index is $k_l$, derived from a table lookup for this model state and mixture component i.

9. A method for assigning codewords bits among a number of feature vectors to be used in automatic recognition comprising:

dividing an observation vector into a number of subvectors;

assigning a first set of bit numbers to each subvector;

performing vector quantization on said subvectors;

performing recognition using said quantized subvectors;

measuring recognition performance;

assigning additional bits to subvectors incrementally until the desired recognition performance is reached or a threshold of assigned bits is reached; and selecting the bit values that achieve the most desired performance.

10. The method according to claim 9 wherein said recognition performing step comprises using stored statistical models with trained parameters for computing likelihoods of said quantized subvectors.

11. The method according to claim 10 wherein said stored statistical models are associated with a subunit of speech and represent that subunit of speech as a plurality of states, each state having associated with it a probability function, the probability functions having parameters determined from training data, the probability function producing a probability that a given set of speech data is representative of that particular state, the recognized known labels comprising words in the recognition database.

12. The method according to claim 11 wherein the probability functions are stored in the system as a mixture of simple probability functions.

13. The method according to claim 12 wherein the simple probability functions are discrete pre-computed probability values retrieved by a table look-up.

14. The system according to claim 12 wherein the simple probability functions are Gaussians.

15. The method according to claim 14 wherein the speaker independent probability functions are mixtures of Gaussians having the form:

$$p_{SI}(y_t|s) = \sum_i \rho(\omega_i|s_t) N(y_t; \mu_{ig}, \Sigma_{ig}).$$

16. The method according to claim 10 wherein each of said stored statistical models is associated with a subunit of speech.

17. The method according to claim 10 wherein said recognition performing step is vector quantized subvector recognition using discreet HMMs having the form:

$$P_s(X_t) = \sum_{i=1}^{32} \lambda_i \cdot P_{si}(VQ_1 = k_1) \cdot P_{si}(VQ_2 = k_2) \cdot$$

$$P_{si}(VQ_3 = k_3) \cdot P_{si}(VQ_4 = k_4) \cdot P_{si}(VQ_N = k_N)$$

where $P_s(X_t)$ is the probability for a particular model state s that $X_t$ was produced by that state, $\lambda_i$ is the weight of the i-th mixture component, $k_l$ is the codebook index observed at time t for the first subvector, and $P_{si}(VQ_l=k_l)$ is the probability that the fist subvector index is $k_l$, derived from a table lookup for this model state and mixture component i.

18. A method for developing models in a recognition system for responding to data representative of captured physical speech, comprising the steps of:

selecting a multi-state model with state probability functions, said state probability functions being of a general form with initially undetermined parameters, said models divided into subvector models for recognizing subparts of observation vectors;

creating individual instances of a model for each subunit of speech to be processed;

using training data from a plurality of speakers to determine acoustic features of states of said models and to estimate probability density functions for said models;

clustering states based on their acoustic similarity;

creating a plurality of cluster codebooks, said cluster codebooks consisting of probability density functions that are shared by each cluster's states; and reestimating the probability densities of each cluster codebook and the parameters of the probability equations in each cluster.

19. A method for developing models in a recognition system for responding to data representative of captured physical speech, comprising the steps of:

selecting a multi-state model with state probability functions, said state probability functions being of a general form with initially undetermined parameters, said models divided into subvector models for recognizing subparts of observation vectors, wherein said observation computation is based on performing an iteration of a forward-backward algorithm on the training speech data and is of the following form for every state s and mixture component i and at every time t:

$$\gamma_t(s, i) = \frac{\alpha_t(s)\beta_t(s)}{\sum_{s'} \alpha_t(s')\beta_t(s')} \cdot \frac{\lambda_i \cdot P_{si}(VQ_1 = k_1) \cdot P_{si}(VQ_2 = k_2) \cdot P_{si}(VQ_3 = k_3) \cdot P_{si}(VQ_4 = k_4) \cdot P_{si}(VQ_N = k_N)}{\sum_{j=1}^{32} \lambda_j \cdot P_{sj}(VQ_1 = k_1) \cdot P_{sj}(VQ_2 = k_2) \cdot P_{sj}(VQ_3 = k_3) \cdot P_{sj}(VQ_4 = k_4) \cdot P_{sj}(VQ_N = k_N)}$$

where the quantities $\alpha_t(s), \beta_t(s)$ are the alpha and beta probabilities that are computed with the forward-backward algorithm, and the probabilities of the subvectors are computed using the previous estimates of the model parameters;

thereafter computing new estimates for the subvector probabilities using the following formula:

$$P_{si}(VQ_1 = k_1) = \frac{\sum_{\substack{\text{Times } t \text{ where} \\ \text{index of first} \\ \text{subvector is } kl}} \gamma_t(s, i)}{\sum_{\text{Times } t} \gamma_t(s, i)}$$

thereafter updating similarly the probabilities of all the subvectors for all states s and mixtures i; thereafter replacing previous values of said subvector probabilities with new estimates until a predefined convergence criterion is not met, thereafter creating individual instances of a model for each subunit of speech to be processed;

using training data from a plurality of speakers to determine acoustic features of states of said models and to estimate probability density functions for said models;

clustering states based on their acoustic similarity;

creating a plurality of cluster codebooks said cluster codebooks consisting of probability density functions that are shared by each clusters states; and reestimating the probability densities of each cluster codebook and the parameters of the probability equations in each cluster.

* * * * *